United States Patent [19]
Danahy et al.

[11] Patent Number: 5,758,077
[45] Date of Patent: May 26, 1998

[54] SERVICE-CENTRIC MONITORING SYSTEM AND METHOD FOR MONITORING OF DISTRIBUTED SERVICES IN A COMPUTING NETWORK

[75] Inventors: John J. Danahy, Canton; Daryl F. Kinney, Hopkinton; Gary S. Pulsinelli, Leominster; Lawrence J. Rose, Chelmsford; Navaneet Kumar, Malden, all of Mass.

[73] Assignee: Hewlett-Packard Company, Palo Alto, Calif.

[21] Appl. No.: 691,994

[22] Filed: Aug. 2, 1996

[51] Int. Cl.[6] .................................................. G06F 15/76
[52] U.S. Cl. ........................... 395/200.31; 395/200.33
[58] Field of Search ........................ 395/200.31, 200.33

[56] References Cited

U.S. PATENT DOCUMENTS 5,287,537  2/1994  Newmark et al. .................. 395/800.29
5,537,542  7/1996  Eilert et al. ........................ 395/184.01

OTHER PUBLICATIONS

Hewlett–Packard Journal, Dec. 1995, Michael M. Kong, pp. 6–15, "DCE: An Environment for Secure Client/Server Computing".

Hewlett–Packard Journal, Dec. 1995, M. M. Kong et al., p. 23–27, "DCE Directory Services".

*Primary Examiner*—Krisna Lim

[57] ABSTRACT

A distributed computer system service monitor provides information to a user regarding the status of services available on the computer system. The computer system includes plural host computers which act as servers and clients in connection with the services. The computer system is logically segregated into functional entities and sub-entities which define service regions and system layers. At least one host computer serves as the service monitor and includes a discovery function for passing a set of queries to other host computers and for using the responses (i) to identify functional entities and sub-entities served by each host computer and (ii) to determine whether each host computer acts as a server or a client or both and (iii) to determine the service or services performed or consumed by each host computer. The service monitor constructs a database which stores service information for each functional entity. The service information includes at least a list of host computers within the functional entity; services available in the functional entity; and whether each host computer acts as a server or a client for each service. The service monitor periodically interrogates each host computer in the functional entity with a set of queries; records responses thereto and employs the responses to determine if a change in status of any of the services has occurred. If a change in status is determined, the change is indicated to the user. In addition, status changes are calculated for further system layers of functionality so as to determine the effect thereon of the status change.

14 Claims, 6 Drawing Sheets

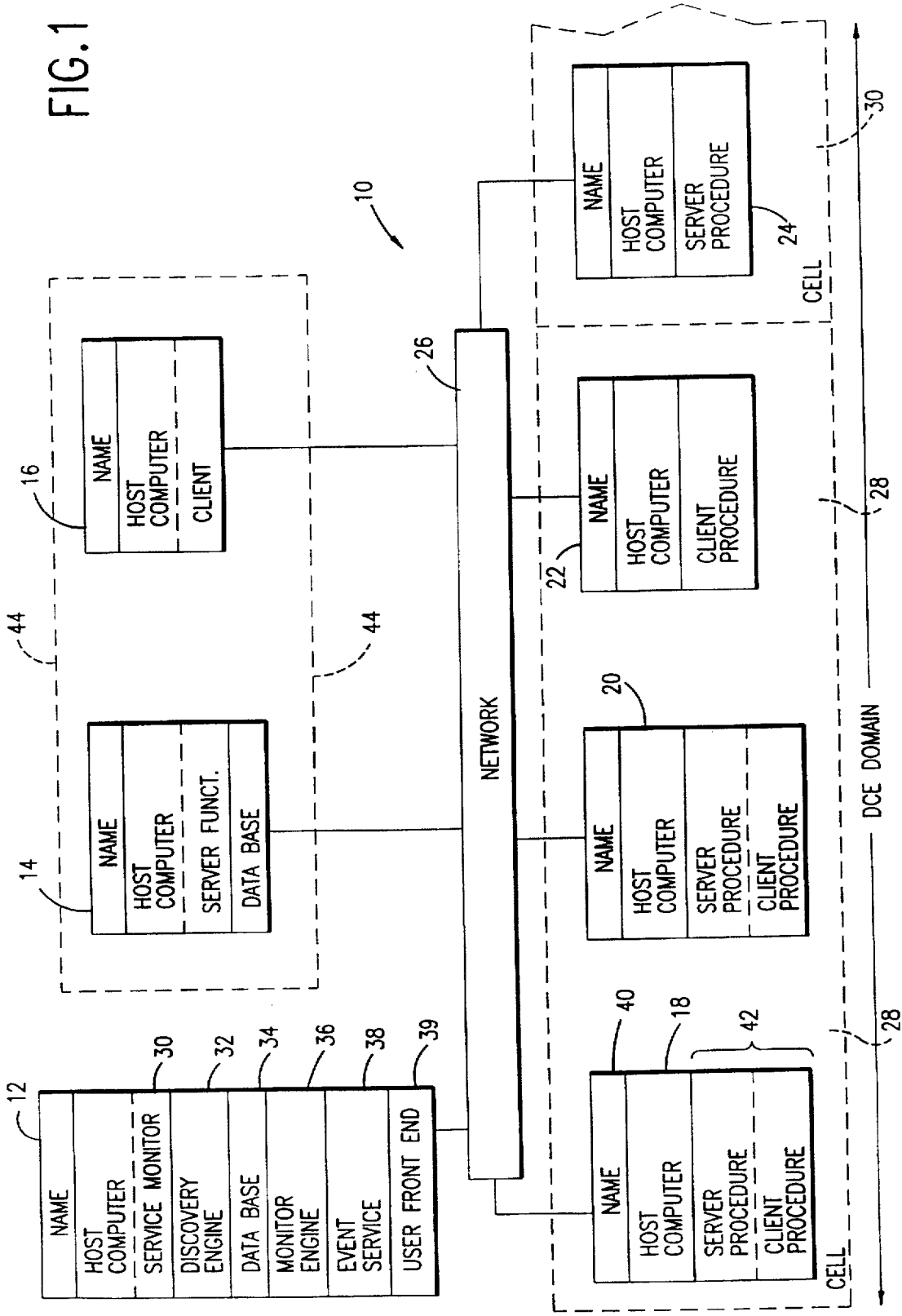

SERVICE-CENTRIC MONITORING SYSTEM AND METHOD FOR MONITORING OF DISTRIBUTED SERVICES IN A COMPUTING NETWORK

FIELD OF THE INVENTION

This invention relates to distributed computing systems and, more particularly, to a service monitor for a distributed computing system which provides updates on the status of services available on the distributed computing network.

BACKGROUND OF THE INVENTION

Many computing installations comprise networks of multiple computers which interact on a continuing basis. The objective of such computing networks is to manifest to the user a single, coherent computing engine. A number of software systems have been developed that effectively mask differences among different kinds of computers in the computing network and enable such computers to interact on an efficient basis, both as servers and as clients.

A server is a computing procedure which runs on a host computer and performs a predefined service for a client procedure, whether the client procedure is running on the same host computer or on another host computer. A client procedure is the consumer of the service. Both client and server procedures may run on the same host computer or may run on different host computers.

Distributed Computing Environment (DCE) software provides functionality to integrate a group of networked computers into a single computing engine. Other software systems such as Encina (a transaction processing tool), NIS (Network Information Service, a networking tool), Network File System are other examples of such system integration software.

DCE is, however, a widely accepted protocol for integration of a distributed computing system and, hereafter, will be described in further detail. However, it is to be understood that the invention to be described below is equally applicable to other software protocols which perform functions that enable integration of distributed computing systems. DCE is a suite of software that enables networked computers to share data and services efficiently and securely. DCE provides a number of services across the integrated computing network:

a) Security: This is a set of services for authentication (to verify user identity), authorization (to control user access to data and services), and account management.

b) Cell Naming Service: This is a service that maintains a database of objects in a DCE cell and maps their names (which are readable by human users) to their identifiers and locations (which are used by programs to access the objects)

c) Global Directory Service: This is a service that maintains a database of objects that may exist any where in the world and enables DCE programs to access objects outside a cell.

d) Distributed Time Service: This is a service that synchronizes clocks on DCE host computers with each other and, optionally, with an external clock.

e) Distributed File Service: This is a service that allows DCE host computers to access each other's files via a consistent global file naming hierarchy in the DCE name space.

DCE applications interact in accordance with a client/server model, wherein a client is a user of a service and a server is a provider of the service. Client programs issue requests for service and a server program acts on and responds to those requests. A program may perform both client and server roles at once, using one service while providing another.

DCE is referred to as a "domain" in a distributed computing system. Another domain may be a database accessible to various host computers on the network; a network information service; or another overall functionality available to various host computers in the network. Within each DCE domain, there are one or more "cells", i.e., an administrative unit encompassing one host computer or many host computers that are interconnected via the network. A cell is usually defined in accordance with administrative boundaries (i.e., a company's data processing network).

Each DCE cell includes a minimum set of services to enable distributed applications to interact properly. Distributed application clients find their application servers by looking up information posted in a DCE cell naming service. Application servers determine the authenticity and authorization level of clients by using highly protected information from a DCE security service. The security service uses time information from cell-wide DCE distributed time service to limit the life span of security information. Other services may be present in a DCE cell, but the aforementioned security, naming and time services are normally the minimum that exist in a cell.

Each service is provided by a server (or servers) within the cell and works with a subset of client procedures. Each client looks to a particular server for its required DCE cell service. As indicated above, there are often plural DCE cells in a DCE domain, and each cell includes the minimum required services for its resident host computers.

Given the complexity of distributed computing systems, as described above, the monitoring of system functionality has obviously been addressed in the prior art. Existing monitoring tools view the production of distributed services on a per-machine basis. If the entire service is limited to a certain machine, the viewer is provided with sufficient information regarding the health of the particular service. In a distributed service environment, however, a single machine focus does not represent the state of an overall distributed service, which may involve the cooperation of many host computers.

Accordingly, there is a need for a service monitor in a distributed computer system which accurately presents to a user, the status of plural services available on the computer system. The service monitor should further indicate the effects of a change in status of one component of a distributed service function on the overall availability of the service and should have the capability of indicating various levels of service degradation for user review.

SUMMARY OF THE INVENTION

A distributed computer system service monitor provides information to a user regarding the status of services available on the computer system. The computer system includes plural host computers which act as servers and clients in connection with the services. The computer system is logically segregated into functional entities and sub-entities which define service regions and system layers. At least one host computer serves as the service monitor and includes a discovery function for passing a set of queries to other host computers and for using the responses (i) to identify functional entities and sub-entities served by each host computer and (ii) to determine whether each host computer acts as a server or a client or both and (iii) to determine the service or services performed or consumed by each host computer. The service monitor constructs a database which stores service information for each functional entity. The service information includes at least a list of host computers within the functional entity; services available in the functional entity; and whether each host computer acts as a server or a client for each service. The service monitor periodically interrogates each host computer in the functional entity with a set of queries; records responses thereto and employs the responses to determine if a change in status of any of the services has occurred. If a change in status is determined, the change is identified to the user. In addition, status changes are calculated for further system layers of functionality so as to determine the effect thereon of the status change.

BRIEF DESCRIPTION OF THE DRAWINGS

FIG. 1 is a block diagram of a distributed computer system including a service monitor constructed in accordance with the invention.

DETAILED DESCRIPTION OF THE INVENTION

Figure 2A:
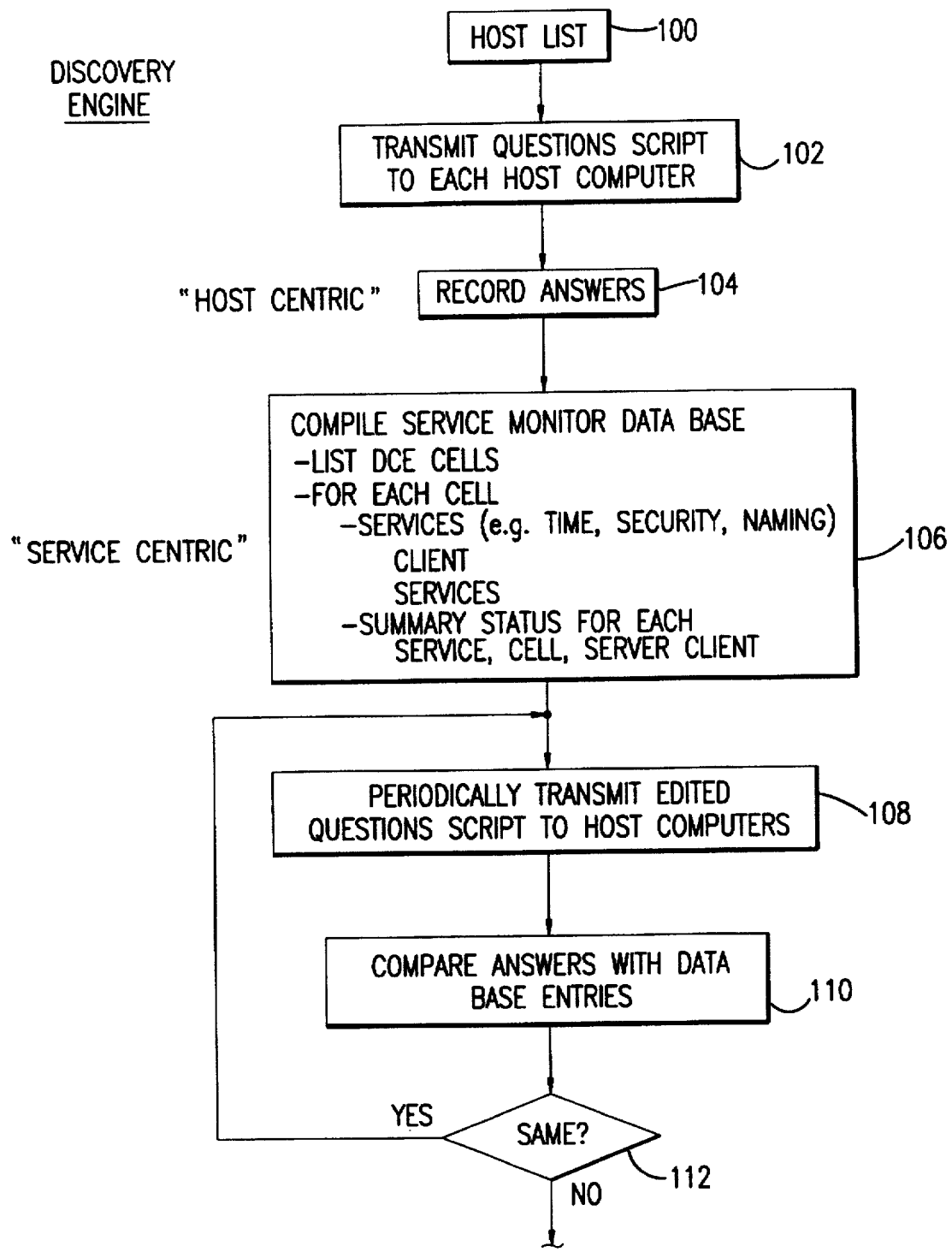
FIGS. 2a and 2b illustrate a logical flow diagram of the method of the invention performed by the service monitor function hereof.

Referring to FIG. 1, a distributed computer system 10 includes a plurality of host computers 12, 14, 16, 18, 20, 22, 24, . . . etc. that are interconnected by a network 26. Each host computer is adapted to perform data processing services for a local user, employing resources available throughout distributed computing system 10. For example, host computers 14 and 16 perform a database function and comprise a domain in distributed computing system 10. Further, host computers 18, 20, 22 and 24 are part of a DCE domain that includes two cells 28 and 30 (with cell 30 being only partially shown).

Each host computer may perform a server function, a client function, or a combination of server and client functions. Further, a single server function may be distributed amongst plural host computers. Host computer 12 is assigned the service monitor function and includes a service monitor procedure 30 (i.e., a software package). Within service monitor procedure 30 are plural subprocedures, i.e., discovery engine 32, monitor database 34, monitor engine 36, event service 38 and a user front end 39.

Each of the aforesaid subprocedures is employed in the monitoring of service functions that are available on distributed computing system 10 and report whether each service is functional, non-functional or partially functional.

Each host computer (e.g. 18) includes a name or identifier 40, and software 42 for controlling the local computer to perform either its client function or server function, or both. Hereafter, the operation of service monitor procedure 30 will be considered in detail in regards to the DCE domain and, in particular, DCE cells 28 and 30. It is to be understood, however, that service monitor procedure 30 performs the identical function for other domains within distributed computing system 10, e.g., database domain 44.

Figure 2B:
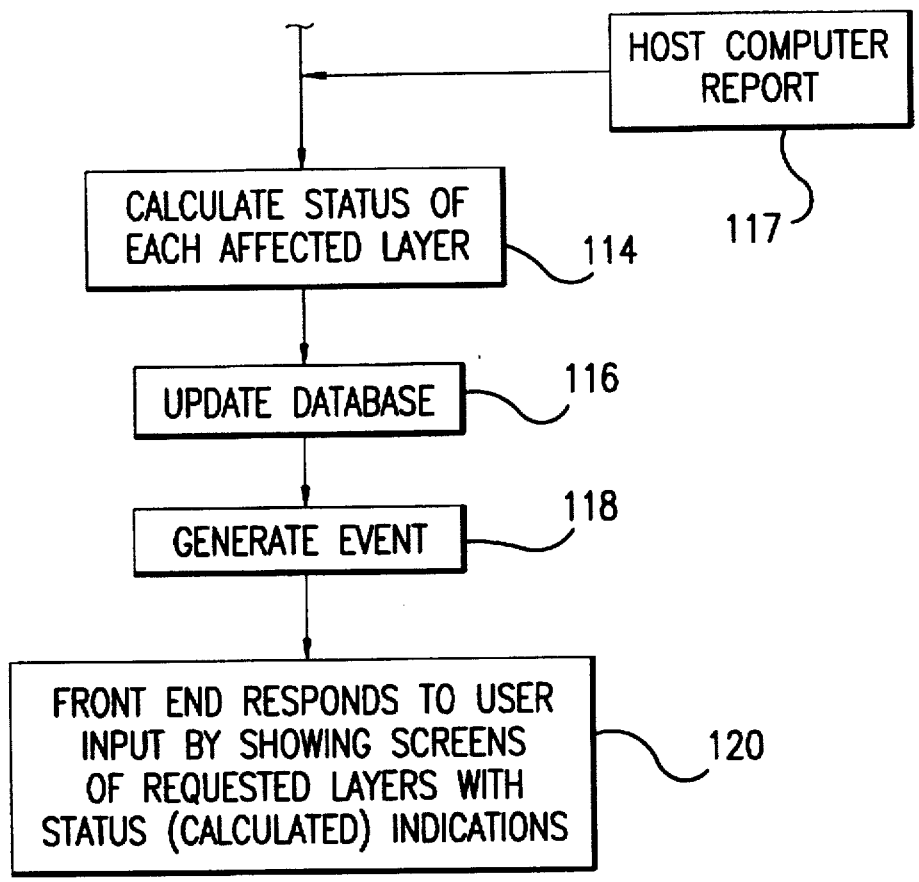

Referring to FIGS. 2a and 2b, service monitor procedure 30 will be described in connection with the logic flow diagram shown therein. In brief, service monitor procedure 30 initially discovers, in a "host centric" manner, the various services consumed or performed by each host computer; whether each host computer includes server procedures, client procedures or both; and a status indication for each procedure. That data is accumulated by discovery engine 32.

Thereafter, a monitor database 34 is constructed which is "service-centric" organized and defines the available services; which host computers act as clients for each service; which host computers act as servers for each service; and a status indication for each service, server and client. Further, each host computer is associated with a cell in which it is located.

Once monitor database 34 is constructed, monitor engine 36 periodically interrogates each host computer to determine if there has been any change in the data or status previously entered. If there has been a change, an "event" is generated which causes the database to be updated to indicate the new information, and a screen is displayed for user viewing which indicates the service layer at which a change has occurred. Service monitor procedure 30 then calculates the affect of the change upon other layers of the service system configuration and enables the user to interrogate those other levels to understand the overall affect of the change.

With reference to FIGS. 2a and 2b, discovery engine 32 is provided initially with a list of names of host computers within each domain (Box 100). As indicated above, it is assumed that service monitor procedure 30 is monitoring the status of the DCE domain and cells 28 and 30 therein. Discovery engine 32 is also provided with a question "script" which is transmitted to each host computer in the DCE domain. While the questions script may be variously constructed, in essence, the identical script of questions is submitted to each host computer.

The questions contained in the script (paraphrased) include at least the following for the DCE domain:

1) Are you there?
2) Are you running as a Security Server?
3) Are you running as a Security Client?
4) Are you running as a Naming Server?
5) Are you running as a Naming Client?
6) Are you running as a Time Server?
7) Are you running as a Time Client?
8) For any function you are running, indicate its status.

After the questions script has been transmitted to each host computer (Box 102), each host computer assembles an answer which identifies a cell in which it performs either a server or a client function: the service which it performs (or consumes), and status indications for each client/server function. Those answers are transmitted back to discovery engine 32 (Box 104) which records the answers in a host-centric manner in database 34.

As indicated above, each host computer identifies a status for its client/server function. A preferred status reporting hierarchy is as follows:

Normal: Operating normally (color: green)

Warning: A potential problem may be imminent (color: cyan).

Minor: A minor problem has arisen, normal usage still possible (color: yellow).

Major: A major or critical problem has arisen which is due to the failure of some other service (color: orange).

Critical: A critical problem has arisen, the entity is not functioning (color: red).

Figure 3:
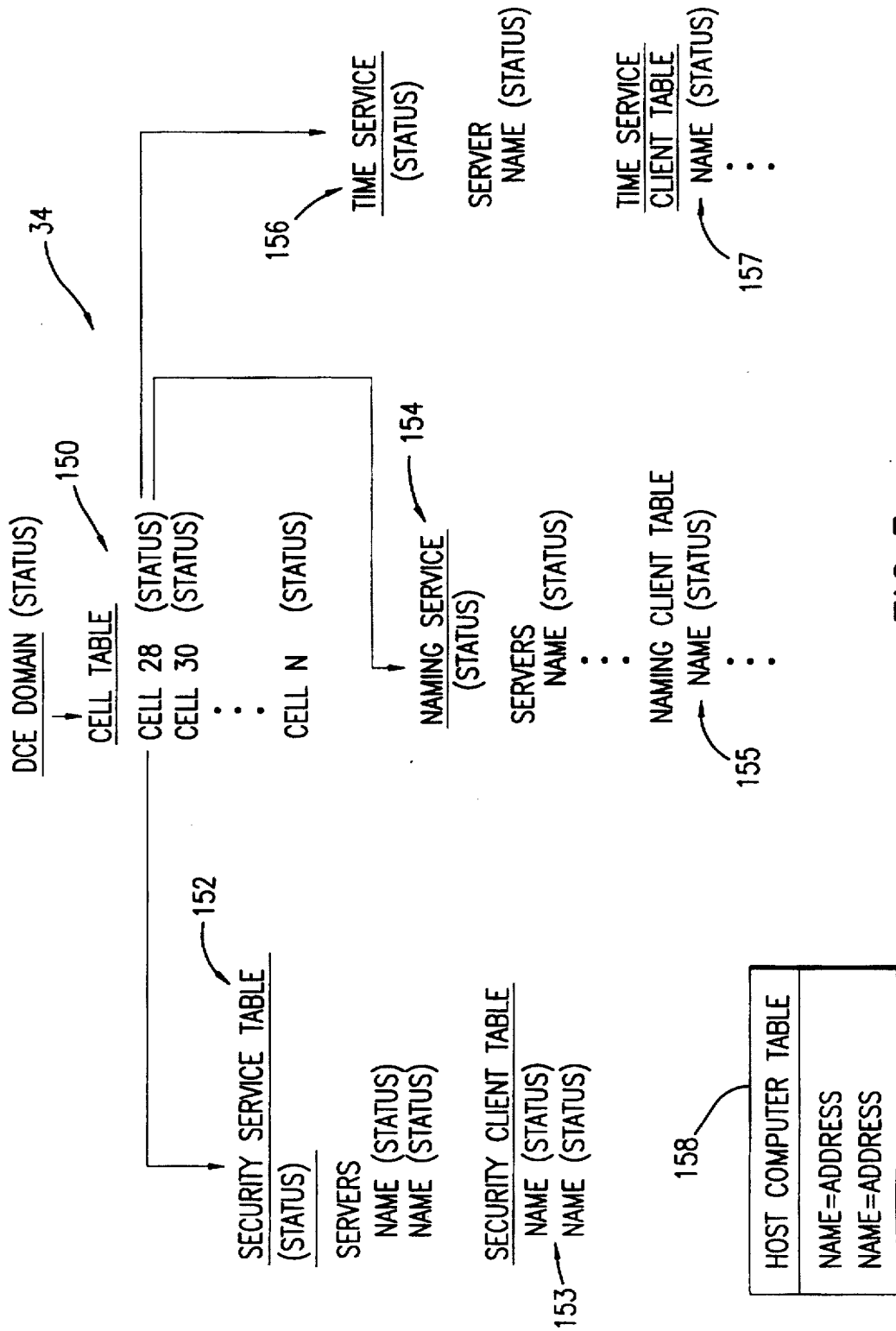
FIG. 3 is a schematic block diagram of a service monitor database maintained by the service monitor function of FIG. 1.

Discovery engine 32 now proceeds to construct a service-centric monitor database (box 106) which is conceptually shown in FIG. 3. Monitor database 34 includes a list of DCE cells; for each cell, an indication of the services which are provided; which host computers serve as clients for each service in the cell; which host computers serve as servers for each service in the cell; a status of each service and server in the cell; a status for each client and associated service in the cell; and a summary status for each service. Note that the summary status for each service is calculated based upon the status reported by individual clients and/or servers.

In FIG. 3, monitor database 34 includes a structure that comprises a cell table 150 which lists each of the cells within the DCE domain. Each cell entry includes pointers to further tables which define the individual services available within the cell. Thus, security service table 152 lists both servers and clients for the security service. Each server entry includes an identity of the host computer performing the server function and an indication of its last status report. Security client table 153 includes a list of client host computers, their last reported status, and an overall status indication for the service.

Similar listings are provided for naming tables 154 and 155 and time tables 156 and 157. A host computer table 158 is also included and equates the respective computer names to machine addresses. In summary, monitor database 34 provides a data structure which interrelates each host computer and the service it performs or consumes, and interrelates each of the services to a defined cell structure and domain.

Once monitor database 34 has been constructed, monitor engine procedure 36 becomes active and periodically, transmits an edited questions script to each host computer (Box 108, FIG. 2a). The questions script is edited in accordance with the responses provided to the original questions script (transmitted by discovery engine 32). More specifically, for a host computer providing a security service, questions regarding naming and time services are not included. If the host computer is involved with the naming service, questions regarding the security and time services are not included.

Monitor engine procedure 36, upon receiving answers to the edited questions script from each host computer, compares the answers with entries in monitor database 34 (Box 110) to determine if they are the same or different. If they are the same, the procedure recycles and no "event" is generated. If the received answers are different from those contained within monitor database 34 (Decision Box 112), an "event" is generated (Box 118) once discovery engine 32 has updated monitor database 34 in accordance with the newly received data (Boxes 114 and 116).

Note that while monitor engine 36 is responsive to answers received in response to the edited question script, the host computer may independently report a change in status (Box 117), causing the generation of an event.

The generation of an event is often the result of a portion of a host computer becoming inoperative. It also may be the result of a portion of network 26 becoming non-functional or some other system functionality becoming inoperative. In any case, service monitor 30 calculates a status of associated layers of service system functionality in response to the change in status of, for instance, a host computer (Box 114). Upon the calculation being completed, user front end 39 is notified of the respective changes of status in each system layer, and causes the display of a screen on host computer 12 of the layer of service system functionality which reported the change in status (Box 120).

Figure 4A:
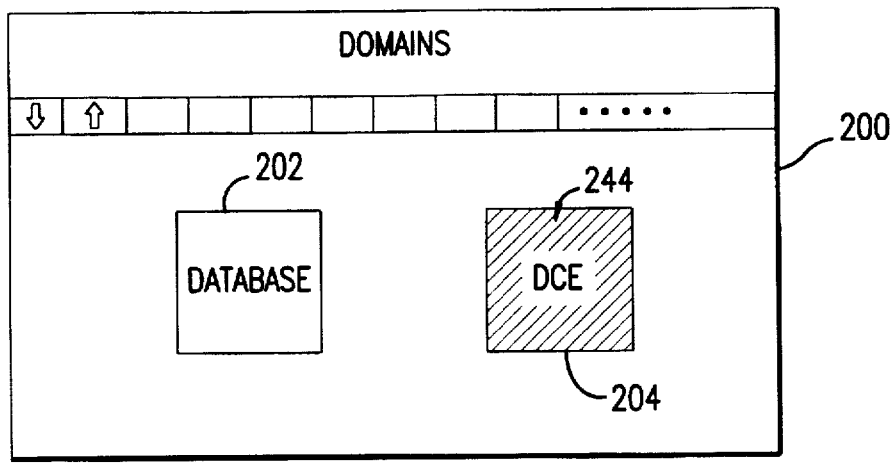
FIGS. 4a, 4b, 4c, 4d and 4e illustrate screens displayed for the user which define service status at defined layers of system configuration.
Figure 4B:
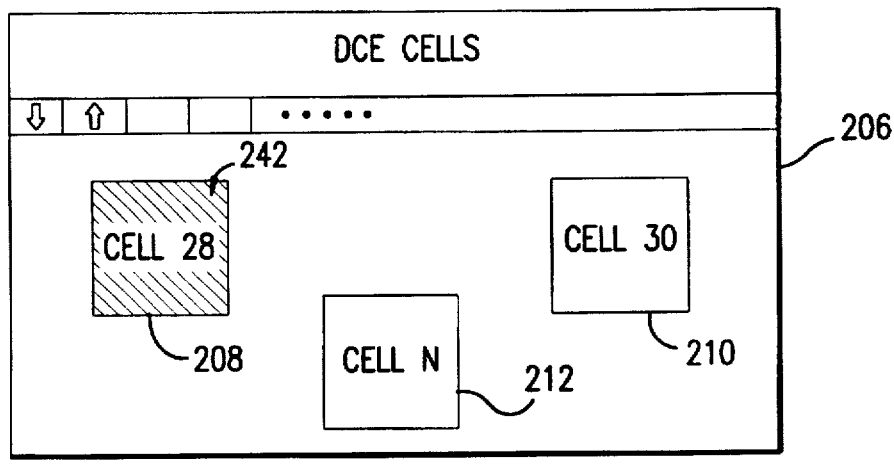
Figure 4C:
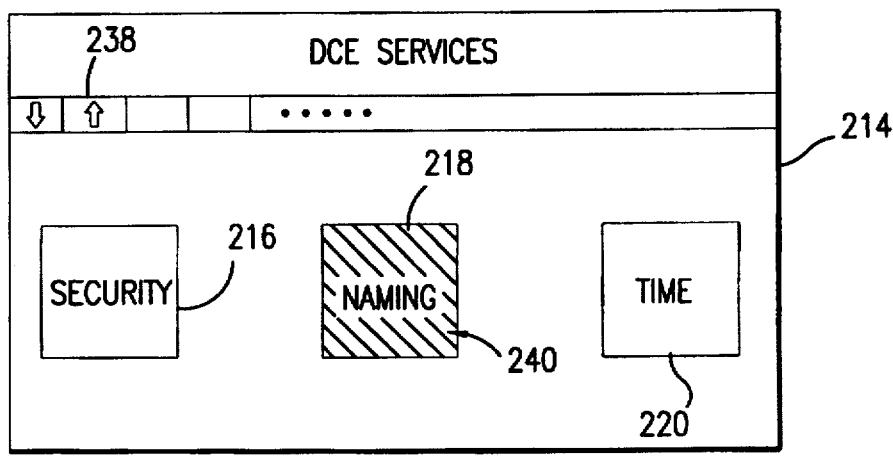
Figure 4D:
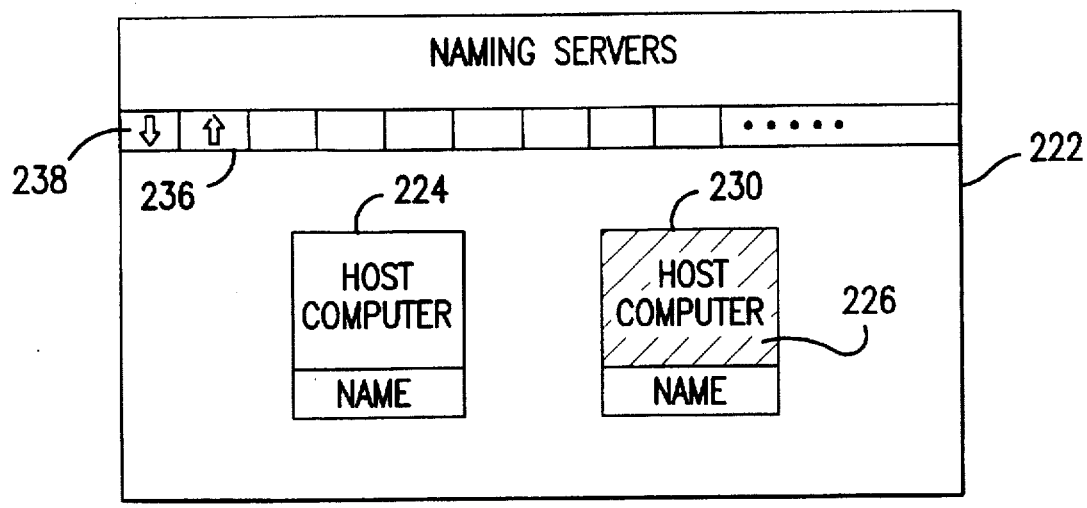
Figure 4E:
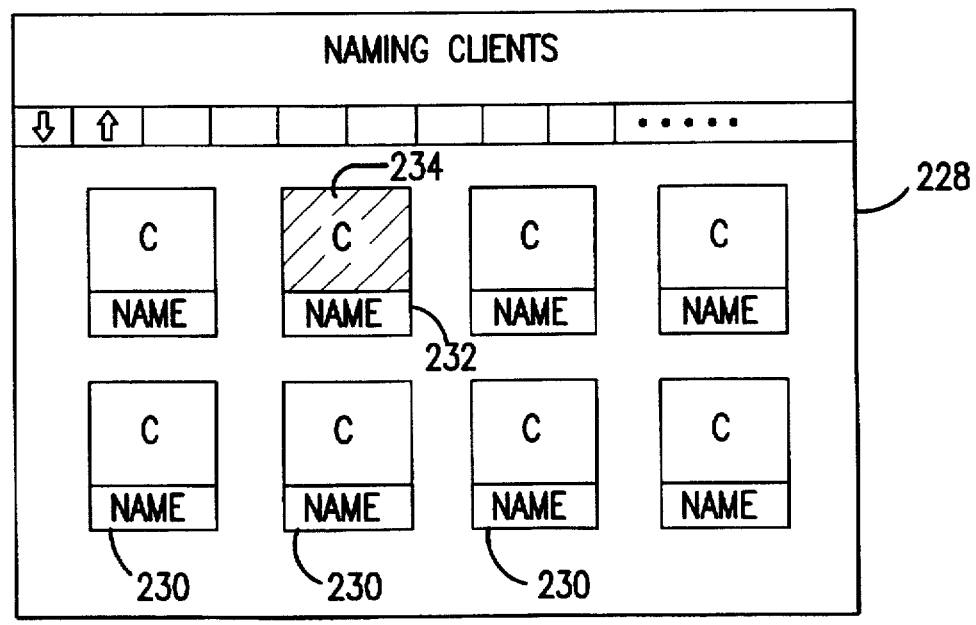

In response to a user's input, user front end 39 is enabled to display screens indicating other layers of the service system and their calculated changes in status that result from the reported actual change in status (Box 120). This will be better understood by reference to FIGS. 4a–4e, wherein examples of individual screens are displayed. Screen 200 shown in FIG. 4a includes two boxes 202 and 204 which identify domains that are present in distributed computing system 10. FIG. 4b illustrates a screen 206 which indicates that cells 208, 210 and 212 are present in DCE domain 204. FIG. 4c illustrates a DCE services screen 214 which identifies the specific services 216, 218 and 220 that are available in cell 208 (screen 206) in FIG. 4b. FIG. 4d illustrates screen 222 which shows two host computers 224 and 226 which act as servers for service 218 identified in FIG. 4c. FIG. 4e illustrates a screen 228 which identifies plural host computers 230 which act as clients for a service provided by host computer server 226 shown in FIG. 4d.

Assume now, that, as shown in FIG. 4d, host computer 226, in response to an inquiry from monitor engine 36, indicates a change in status of its ability to provide the naming service. In response, user front end 39 displays screen 222 which identifies host computer 226 and assigns it a color 230 indicative of its change in status. Assume further that the change in status designates a "potential difficulty in accessing a client host computer 232" (FIG. 4e).

In response, monitor engine 36 determines that client host computer 232 may not be able to access naming service provided by server host computer 226, and therefore calculates an assigned status (e.g., a color) 234 for assignment to the icon which represents computer 232 (see FIG. 4e). Because client host computer 232 is not able to access the naming service function performed by host computer 226, monitor engine 36 assigns a status value of "major" which indicates that a major problem has arisen that is due to the failure of another service which is depended upon (i.e., a communication service).

The user can now access screen 228 shown in FIG. 4e from screen 222 in FIG. 4d, by clicking on down arrow 236. To move upward through screens which illustrate additional layers of service system configuration, the user clicks on up arrows 238 in each of the displayed screens. By clicking on up arrow 238 in naming client screen 228 (FIG. 4e), server screen 222 (FIG. 4d) is displayed and upon clicking on the up arrow 238 therein, services screen 214 is displayed (FIG. 4c). There, it can be seen that naming service icon 218 manifests a yellow color 240 which has been calculated as representing the status thereof as a result of the initial report regarding the naming procedure in server host computer 226.

By again clicking on up arrow 238 in screen 214, screen 206 is accessed wherein cell 208 has been assigned a color 242 (cyan) that indicates that a potential problem may be imminent as a result of the communication status change reported regarding the naming function in server host computer 226. In a similar fashion, screen 200 (FIG. 4a) can be accessed wherein DCE domain icon 202 has been assigned a cyan color 244. In such manner, no matter what screen the user is viewing, the change of the assigned coloration to an icon indicates a change in status. Further, the up/down arrows enable a user to scroll through the various screens to determine both the reported and calculated changes in service status at various system layers, simply by viewing the colors assigned to the affected service/system component.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A distributed computer system service monitor for providing information to a user regarding status of services available on said system, said system including plural host computers which act as servers and clients in connection with said services, said system logically segregated into functional entities and subentities which define service regions and include said host computers, at least one host computer serving as said distributed computer system service monitor and comprising:

discovery means for transmitting a first script of queries to other said host computers, and for utilizing each host computer's responses to said first script of queries to identify functional entities and subentities served by each host computer, whether as a server or a client, and what service or services are performed by each host computer;

database means for storing for at least each functional entity, service information for said functional entity, said service information including at least a list of host computers within said functional entity, services available in said functional entity and whether said each host computer acts as a server or a client for each service;

monitor means for periodically interrogating each host computer in said functional entity with a set of queries, recording responses thereto, employing said responses to determine if a change in status of any of said services has occurred, and if a change in status is found, identifying said change in status of said service to said user.

2. The distributed computer system service monitor as recited in claim 1, wherein said discovery means transmits an identical first script of queries to each said host computer.

3. The distributed computer system service monitor as recited in claim 1, wherein said monitor means queries each said host computer, respectively, with a second script of queries that has been edited from said first script of queries, in accord with responses from each said host computer, respectively.

4. The distributed computer system service monitor as recited in claim 1, wherein said monitor means responds to a change in status, by displaying a screen which indicates by a display change, that a service status has changed.

5. The distributed computer system service monitor as recited in claim 1, wherein said monitor means responds to a change in status by calculating, for each of plural layers of service functionality, the effect of said change in status thereon and assigning to each screen which is used to display a layer of service functionality, a display change which provides a user with an indication of an effect thereon of said change in status.

6. The distributed computer system service monitor as recited in claim 5, wherein said monitor means causes display of plural screens in accord with user request, said plural screens including at least a screen which indicates a service availability, a screen which indicates a host computer acting as a server to provide said service and a screen which indicates a host computer or computers which act as a client or clients for said service.

7. The distributed computer system service monitor as recited in claim 6, wherein said display change is a change of color and plural colors are employed to indicate plural levels of seriousness of the change in status on each screen for each layer of service functionality.

8. A method for providing information to a user of a distributed computer system regarding status of services available on said system, said system including plural host computers which act as servers and clients in connection with said services, said system logically segregated into functional entities and subentities which define service regions and include said host computers, at least one host computer serving as a service monitor and performing the method comprising the steps of:

transmitting a first script of queries to other said host computers, and utilizing each host computer's responses to said first script of queries to identify functional entities and subentities served by each host computer, whether as a server or a client, and what service or services are performed by each host computer;

storing for at least each functional entity, service information for said functional entity, said service information including at least a list of host computers within said functional entity, services available in said functional entity and whether said each host computer acts as a server or a client for each service;

periodically interrogating each host computer in said functional entity with a set of queries, recording responses thereto, employing said responses to determine if a change in status of any of said services has occurred; and if a change in status is found, identifying said change in status of said service to said user.

9. The method as recited in claim 8, wherein said transmitting step transmits an identical first script of queries to each said host computer.

10. The method as recited in claim 8, wherein said periodic interrogating step queries each said host computer, respectively, with a second script of queries that has been edited from said first script of queries, in accord with responses from each said host computer, respectively.

11. The method as recited in claim 8, further comprising the step of:

responding to a change in status, by displaying a screen which indicates by a display change, that a service status has changed.

12. The method as recited in claim 8, further comprising the step of:

responding to a change in status by calculating, for each of plural layers of service functionality, an effect of said change in status thereon and assigning to each screen which is used to display a layer of service functionality, a display change which provides a user with an indication of an effect thereon of said change in status.

13. The method as recited in claim 12, further comprising the step of:

displaying plural screens in accord with a user's request, said plural screens including at least a screen which indicates a service availability, a screen which indicates a host computer acting as a server to provide said service and a screen which indicates a host computer or computers which act as a client or clients for said service.

14. The method as recited in claim 12, wherein said display change is a change of color and plural colors are employed to indicate plural levels of seriousness of the change in status on each screen for each layer of service functionality.

* * * * *